July 19, 1927.

J. W. WELSH

SPECTACLE TEMPLE

Filed March 10, 1923

1,636,340

Inventor:-
James W. Welsh.
by David Rines
Attorney:-

Patented July 19, 1927.

1,636,340

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE.

Application filed March 10, 1923. Serial No. 624,125.

The present invention relates to spectacle temples, and it has for its chief object to provide a temple of the non-metallic type with an improved, flexible hook.

With this and other objects in view, the nature of which will appear from the following description, taken in connection with the accompanying drawings, the invention consists of the improved article hereinafter described, illustrated in the accompanying drawings and defined in the appended claims.

Figure 1:
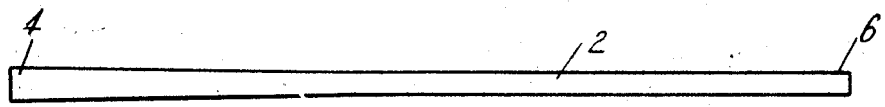
Figure 2:
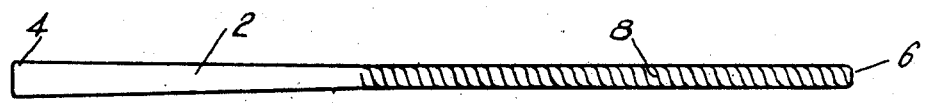
Figure 3:
Figure 4:
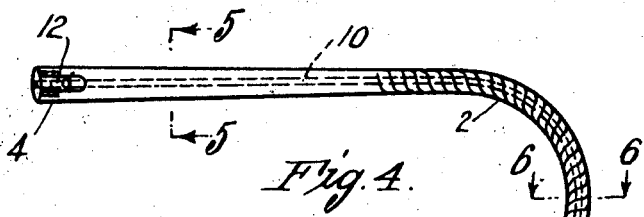
Figure 5:
Figure 6:
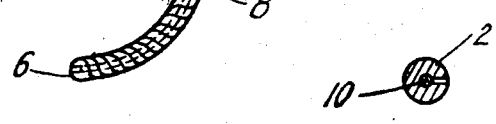

In the accompanying drawings, Figs. 1, 2 and 3 indicate three steps illustrative of the preferred method of making the temple of the present invention; Fig. 4 is a view of a preferred spectacle temple made according to the preferred method; and Figs. 5 and 6 are sections taken upon the lines 5—5 and 6—6 of Fig. 4.

In manufacturing a temple embodying the present invention, it is well to start with a tube 2 of non-metallic material, like zylonite, celluloid and the like, tapering from the larger end or shank portion 4 towards the end 6 of smaller diameter. This material, though flexible, is not sufficiently so in the form shown in Fig. 1 to produce, when the tapered end is bent into the shape of a hook or loop, a temple that may properly be called flexible. The portion of smaller diameter of the tube 2 is therefore cut into the form of a spiral or helix, as shown at 8, which renders it very yielding. By comparison, the uncut portions of the tube on both sides of the cut portion are very rigid, so that a single tubular member 2 is thus provided, having a flexible loop portion 8 coextensive with a helically disposed cut extending through the walls thereof. A metal reinforcing rod or core 10 is now inserted in the bore of the tube, and is fixed therein in any well known manner, with the free end of the metal loop embedded in the corresponding free end of the non-metallic material. The said end of the tube is closed by a plug, as illustrated. The rod 10 may be of the same material of which flexible metal temples are made, or of any other suitable material. The spiral portion 8 of the tube 2 will thus become stiffened, but it will have the same degree of flexiblity as the metal rod 10. The tapered, spirally cut portion of the tube 2, with the metal rod 10 inserted therein, is then bent into a hook or temple shape, leaving the shank portions of the tube and the metal rod 10 relatively straight, as shown in Fig. 4, and the customary hinge plate 12 is added, completing the temple.

The temple of the present invention may, of course, be manufactured also in other ways than that described above, the present application covering the article and not its method of manufacture.

Modifications will occur to persons skilled in the art within the spirit and scope of the appended claims.

What is claimed is:

1. As an article of manufacture, a tube constituted of non-metallic material into which a flexible rod is inserted, a portion of the tube being cut into the form of a spiral, and the cut portion of the tube and the rod inserted therein being bent.

2. A spectacle temple comprising a tapered tube constituted of flexible, non-metallic material into which is inserted a metal reinforcing rod, a portion of smaller diameter of the tapered tube being cut into the form of a spiral, and the cut portion of the tube and the reinforcing rod inserted therein being bent into the shape of a temple.

3. A spectacle temple comprising a metal core having a relatively straight shank portion and a loop portion, and a non-metallic covering for the core comprising a single tubular member, the portion of the tubular member that covers the loop portion of the core being cut into the form of a helix, and the core being fixed in the covering.

4. A temple for spectacles and the like comprising a metal core having a relatively straight shank portion and a loop portion, and a non-metallic covering for said core consisting of a single tubular member having a flexible loop covering portion coextensive with a helically disposed cut extending through the wall thereof, one end of said covering having the free end of the loop embedded therein.

5. A temple for spectacles and the like comprising a metal core having a relatively straight shank portion and a loop portion, and a non-metallic covering for said core consisting of a single tubular member having a flexible loop covering portion coextensive with a helically disposed cut extending through the wall thereof, one end of said covering being closed and having the free end of the loop embedded therein.

6. A temple for spectacles and the like comprising a metal core having a relatively straight shank and a loop, and a non-metallic covering for said core consisting of a tubular member having a flexible portion interposed between relatively rigid portions and co-extensive with a helically disposed cut extending through the wall of said tubular member, and one of said rigid portions being positioned on the core to engage the free end of the loop.

7. A spectacle temple comprising a reinforcing core having a relatively straight shank portion and a rear portion, and a non-metallic covering for the core covering the shank portion and the rear portion, the portion of the covering that covers the rear portion of the core comprising a tubular member that is cut into the form of a helix, and the core being fixed in the covering.

8. A spectacle temple comprising a metal core having a relatively straight shank portion and a flexible loop portion, and a non-metallic covering for the core covering the shank portion and the loop portion, the covering comprising a single tubular member, the portion of the tubular member that covers the loop portion of the core being cut into the form of a helix, whereby the helically cut portion of the tube is stiffened by the loop portion of the core but has substantially the same degree of flexibility as the said loop portion of the core.

9. A spectacle temple comprising a metal core having a relatively straight shank portion and a flexible rear portion, and a non-metallic covering for the core covering the shank portion and the rear portion, the portion of the covering that covers the rear portion of the core comprising a tubular member that is cut into the form of a helix, whereby the helically cut portion of the tube is stiffened by the rear portion of the core but has substantially the same degree of flexibility as the said rear portion of the core.

In testimony whereof, I have hereunto subscribed my name this 7th day of March, 1923.

JAMES W. WELSH.